US012168373B2

(12) United States Patent
Watanabe (10) Patent No.: US 12,168,373 B2
(45) Date of Patent: Dec. 17, 2024

(54) PNEUMATIC TIRE (71) Applicant: The Yokohama Rubber Co., LTD., Tokyo (JP)

(72) Inventor: Daisuke Watanabe, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 816 days.

(21) Appl. No.: 17/270,280

(22) PCT Filed: Aug. 22, 2019

(86) PCT No.: PCT/JP2019/032804
§ 371 (c)(1),
(2) Date: Feb. 22, 2021

(87) PCT Pub. No.: WO2020/045222
PCT Pub. Date: Mar. 5, 2020

(65) Prior Publication Data
US 2021/0170801 A1 Jun. 10, 2021

(30) Foreign Application Priority Data
Aug. 29, 2018 (JP) .................................. 2018-160442

(51) Int. Cl.
*B60C 11/12* (2006.01)
*B60C 11/03* (2006.01)
*B60C 11/13* (2006.01)

(52) U.S. Cl.
CPC ...... *B60C 11/1236* (2013.01); *B60C 11/0304* (2013.01); *B60C 11/033* (2013.01);
(Continued)

(58) Field of Classification Search
CPC ............. B60C 11/0304; B60C 11/0306; B60C 11/1236; B60C 11/033; B60C 2011/0346;
(Continued)

(56) References Cited

U.S. PATENT DOCUMENTS

| 2012/0285592 A1* | 11/2012 | Kameda ................ B60C 11/033 |
| | | 152/209.8 |
| 2013/0118663 A1 | 5/2013 | Kishizoe |
| 2016/0152092 A1 | 6/2016 | Sasaki |
| 2017/0182847 A1 | 6/2017 | Fujii |

(Continued)

FOREIGN PATENT DOCUMENTS

| CN | 103101403 A | 5/2013 |
| CN | 105644274 A | 6/2016 |

(Continued)

*Primary Examiner* — Katelyn W Smith
*Assistant Examiner* — Philip N Schwartz
(74) *Attorney, Agent, or Firm* — Thorpe North & Western (57) ABSTRACT

A pneumatic tire having lug grooves in shoulder land portions that each include one end reaching at least a ground contact edge and an other end terminating in the shoulder land portion. Sipes in the shoulder land portions each include one end communicating with a shoulder main groove and an other end terminating in a ground contact region. Lug grooves in intermediate land portions each include one end communicating with the shoulder main groove and an other end terminating in the intermediate land portion. Sipes in the intermediate land portion each include one end communicating with a center main groove and an other end terminating in the intermediate land portion. Sipes in the center land portion each include one end communicating with the center main groove and an other end terminating in the center land portion without exceeding a tire center line.

11 Claims, 3 Drawing Sheets

(52) U.S. Cl.
CPC ... *B60C 11/1392* (2013.01); *B60C 2011/0346* (2013.01); *B60C 2011/0381* (2013.01); *B60C 2011/133* (2013.01)

(58) Field of Classification Search
CPC ..... B60C 2011/0381; B60C 2011/1361; B60C 2011/1392
USPC .................................................. D12/516, 519
See application file for complete search history.

(56) References Cited

U.S. PATENT DOCUMENTS

| | | | |
|---|---|---|---|
| 2018/0194173 A1 | 7/2018 | Shibai | |
| 2020/0282776 A1* | 9/2020 | Tomomatsu | B60C 11/0304 |
| 2020/0384810 A1* | 12/2020 | Tomomatsu | B60C 11/0306 |
| 2020/0406684 A1* | 12/2020 | Kameda | B60C 11/032 |
| 2021/0155053 A1* | 5/2021 | Tomomatsu | B60C 11/1307 |

FOREIGN PATENT DOCUMENTS

| | | | | |
|---|---|---|---|---|
| CN | 105980173 A | | 9/2016 | |
| CN | 107709047 A | | 2/2018 | |
| CN | 111699096 A | | 9/2020 | |
| EP | 2578417 A1 | * | 4/2013 | ......... B60C 11/0306 |
| EP | 3025875 A1 | | 6/2016 | |
| EP | 3199378 A1 | | 8/2017 | |
| JP | 2008-195100 A | | 8/2008 | |
| JP | 2012228992 A | * | 11/2012 | ............. B60C 11/04 |
| JP | 2013-100020 A | | 5/2013 | |
| JP | 2016-2987 A | | 1/2016 | |
| JP | 2016-101804 A | | 6/2016 | |
| JP | 2017-30557 A | | 2/2017 | |
| JP | 2017-65625 A | | 4/2017 | |
| WO | 2008/096498 A1 | | 8/2008 | |
| WO | 2017/022309 A1 | | 2/2017 | |
| WO | 2019/049765 A1 | | 3/2019 | |

* cited by examiner

PNEUMATIC TIRE

TECHNICAL FIELD

The present technology relates to a pneumatic tire in which four main grooves extending in a tire circumferential direction are formed in a tread portion and five rows of land portions are defined by these main grooves. More specifically, the present technology relates to a pneumatic tire capable of providing, in a compatible manner, both steering stability performance on dry road surfaces and snow performance when a chain is mounted to the pneumatic tire.

BACKGROUND ART

In a tread portion of a pneumatic tire, a tread pattern is formed in which a plurality of main grooves extending in a tire circumferential direction are provided and a plurality of rows of land portions are defined by these main grooves. Further, in such a pneumatic tire, a plurality of lug grooves extending in the tire width direction are provided in each land portion of the tread portion (e.g., see Japan Unexamined Patent Publication No. 2013-100020).

However, in a case where the number of the lug grooves in the tread portion is increased, the rigidity of the tread portion decreases and the steering stability performance on dry road surfaces is reduced. In contrast, in a case where the number of the lug grooves in the tread portion is reduced, snow performance when a chain is mounted to the pneumatic tire is deteriorated. Thus, there is a negative correlation between steering stability performance on dry road surfaces and snow performance when a chain is mounted, and it is difficult to improve both at the same time.

SUMMARY

The present technology provides a pneumatic tire capable of providing both steering stability performance on dry road surfaces and snow performance when a chain is mounted in a compatible manner.

A pneumatic tire according to an embodiment of the present technology includes: a tread portion extending in a tire circumferential direction and having an annular shape; a pair of sidewall portions disposed on both sides of the tread portion; and a pair of bead portions disposed on an inner side of the pair of sidewall portions in a tire radial direction, the tread portion including four main grooves extending in the tire circumferential direction, the four main grooves including: a pair of center main grooves; and a pair of shoulder main grooves the four main grooves defining a center land portion, a pair of intermediate land portions located on outer sides of the center land portion, and a pair of shoulder land portions located on outer sides of the pair of intermediate land portions, lug grooves and sipes extending in a tire width direction being provided in, as the pair of shoulder land portions, a shoulder land portion on a vehicle inner side and a shoulder land portion on a vehicle outer side, each of the lug grooves in each of the shoulder land portions including: one end reaching at least a ground contact edge; and an other end terminating in each of the shoulder land portions, each of the sipes in each of the shoulder land portions including: one end communicating with the shoulder main groove; and an other end terminating in a ground contact region, lug grooves extending in the tire width direction being provided in, as the pair of intermediate land portions, an intermediate land portion on the vehicle inner side and an intermediate land portion on the vehicle outer side, each of the lug grooves in each of the intermediate land portions including: one end communicating with the shoulder main groove; and an other end terminating in each of the intermediate land portions, sipes extending in the tire width direction being provided in the intermediate land portion on the vehicle inner side, each of the sipes in the intermediate land portion on the vehicle inner side including: one end communicating with, of the pair of center main grooves, a center main groove on the vehicle inner side; and an other end terminating in the intermediate land portion on the vehicle inner side, and sipes extending in the tire width direction being provided in the center land portion, each of the sipes in the center land portion including: one end communicating with the center main groove on the vehicle inner side; and an other end terminating in the center land portion without exceeding the tire center line.

According to the present technology, in a pneumatic tire that has a designated mounting direction with respect to a vehicle, by adopting a structure in which intermediate land portions and shoulder land portions on a vehicle inner side and on a vehicle outer side are not divided by lug grooves of the land portions, the rigidity of the intermediate land portions and the shoulder land portions on the vehicle inner side and on the vehicle outer side can be sufficiently ensured, and thus steering stability performance on dry road surfaces can be improved. In particular, by providing lug grooves and sipes in the intermediate land portion on the vehicle inner side, the rigidity of the land portion can be ensured, and responsiveness on dry road surfaces can be maintained. Furthermore, the absence of grooves that communicate with the center main groove on the vehicle outer side makes it possible to increase pattern rigidity and to improve the steering stability performance on dry road surfaces. On the other hand, more lug grooves and sipes are disposed on the vehicle inner side, which has a high improvement effect on snow performance when a chain is mounted to the pneumatic tire (in particular, steering stability performance on snow-covered road surfaces), than on the vehicle outer side, and thus the edge component is relatively large. In particular, in the shoulder land portions, the edge components can be compensated for by the sipes without reducing the rigidity of the land portions while ensuring sufficient edge components by the lug grooves. As a result, both steering stability performance on dry road surfaces and snow performance when a chain is mounted (in particular, steering stability performance on snow-covered road surfaces) can be provided in a compatible manner.

In the present technology, each sipe in the center land portion is preferably on an extension line of each sipe in the intermediate land portion on the vehicle inner side. This configuration can effectively enhance snow performance when a chain is mounted to the pneumatic tire.

In the present technology, in the ground contact region, the total length in the tire width direction of the lug grooves and the sipes on the vehicle outer side of the tire center line is shorter than the total length in the tire width direction of the lug grooves and the sipes on the vehicle inner side of the tire center line, and a ratio of the total length in the tire width direction of the sipes to the total length in the tire width direction of the lug grooves as a whole of the tread portion is preferably from 0.4 to 0.6. As a result, the rigidity of each land portion in the tread portion can be maintained.

In the present technology, the length in the tire width direction of each sipe in the shoulder land portion on the vehicle inner side is preferably equivalent to a length in the tire width direction of each lug groove in the intermediate land portion on the vehicle inner side, and is equivalent to a sum of a length in the tire width direction of each sipe in the center land portion and a length in the tire width direction of each sipe in the intermediate land portion on the vehicle inner side. Thus, the rigidity of the center land portion can be sufficiently ensured, and the steering stability performance on dry road surfaces can be effectively improved.

In the present technology, preferably, the center main groove is disposed in a region of from 15% to 25% with respect to the width from the tire center line to the ground contact edge, and the shoulder main groove is disposed in a region of from 55% to 65% with respect to the width from the tire center line to the ground contact edge. Accordingly, the shoulder land portions are configured to be relatively large, and thus steering stability performance on dry road surfaces can be effectively improved.

In the present technology, each lug groove in the pair of intermediate land portions preferably includes a raised bottom portion at an opening end with respect to the pair of shoulder main groove. Thus, the rigidity of the intermediate land portions can be sufficiently ensured.

In the present technology, of the pair of center main grooves, a center main groove on the vehicle outer side preferably includes a zigzag-shaped chamfered portion. This configuration can effectively enhance snow performance when a chain is mounted to the pneumatic tire, based on the edge effect of the chamfered portion.

In the present technology, a "sipe" refers to a narrow groove having a groove width of 1.0 mm or less, and a "lug groove" refers to a groove having a groove width exceeding 1.0 mm. A "ground contact region" refers to a region in the tire width direction corresponding to the maximum linear distance in the tire width direction of a ground contact surface formed on a flat plate when a tire is inflated to an air pressure corresponding to the maximum load capacity for the tire defined by tire standards (JATMA (The Japan Automobile Tyre Manufacturers Association, Inc.), TRA (The Tire and Rim Association, Inc.), ETRTO (The European Tyre and Rim Technical Organisation), etc.), and is placed vertically on the flat plate in a stationary state and loaded with a load equivalent to 80% of the maximum load capacity. A "ground contact edge" refers to an outermost position of the ground contact region in the tire width direction.

DETAILED DESCRIPTION

Figure 1:
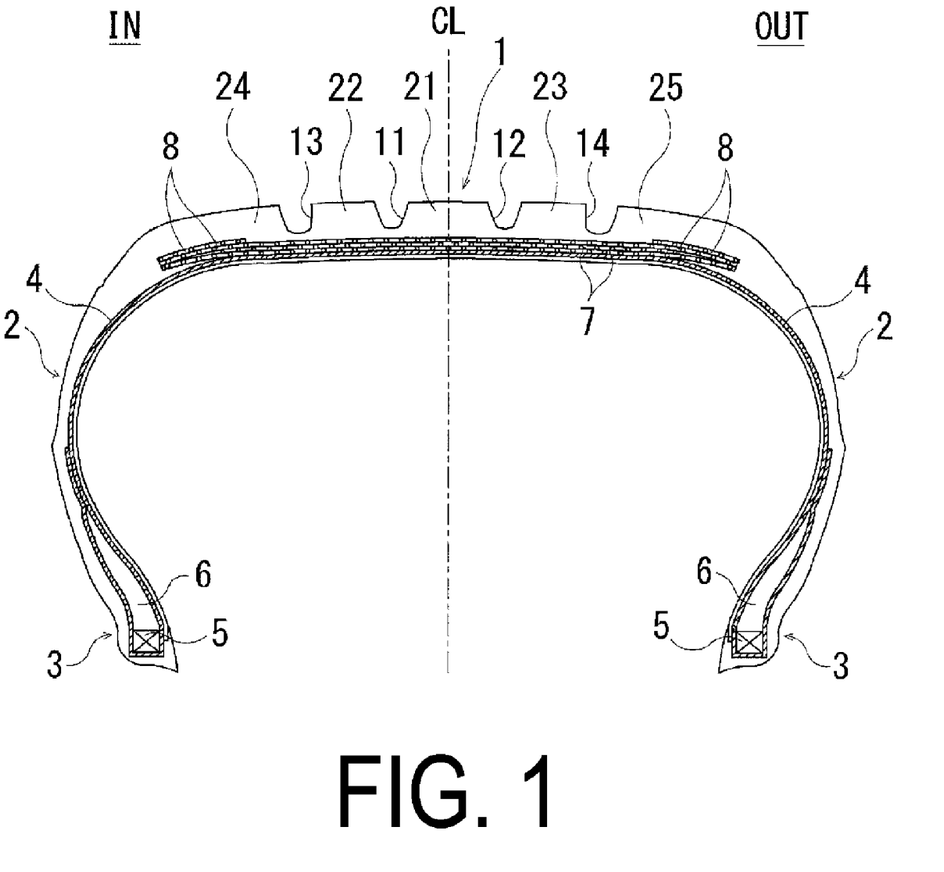
FIG. 1 is a meridian cross-sectional view illustrating one example of a pneumatic tire according to an embodiment of the present technology.
Figure 2:
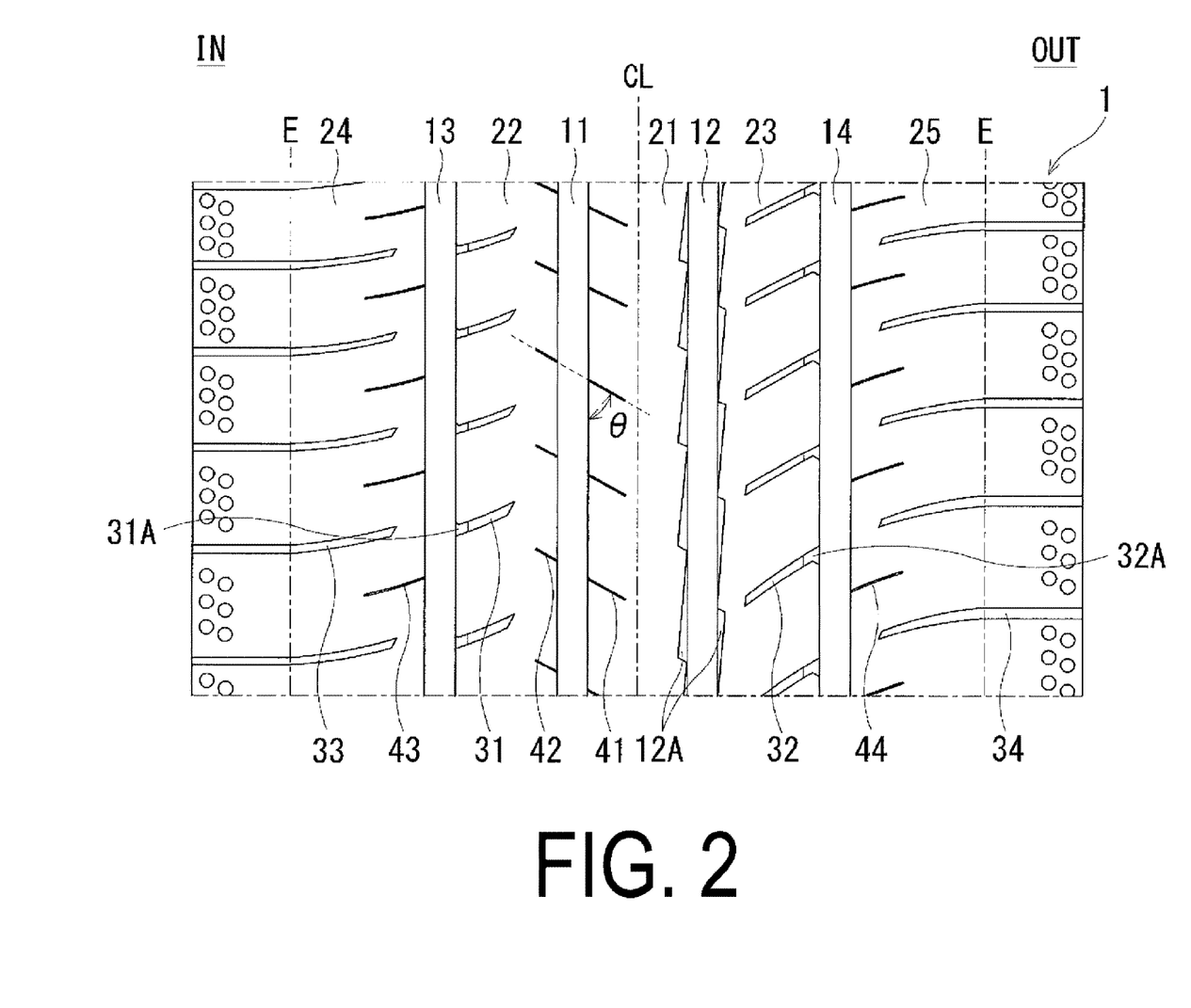
FIG. 2 is a developed view illustrating a tread pattern of a pneumatic tire according to an embodiment of the present technology.
Figure 3:
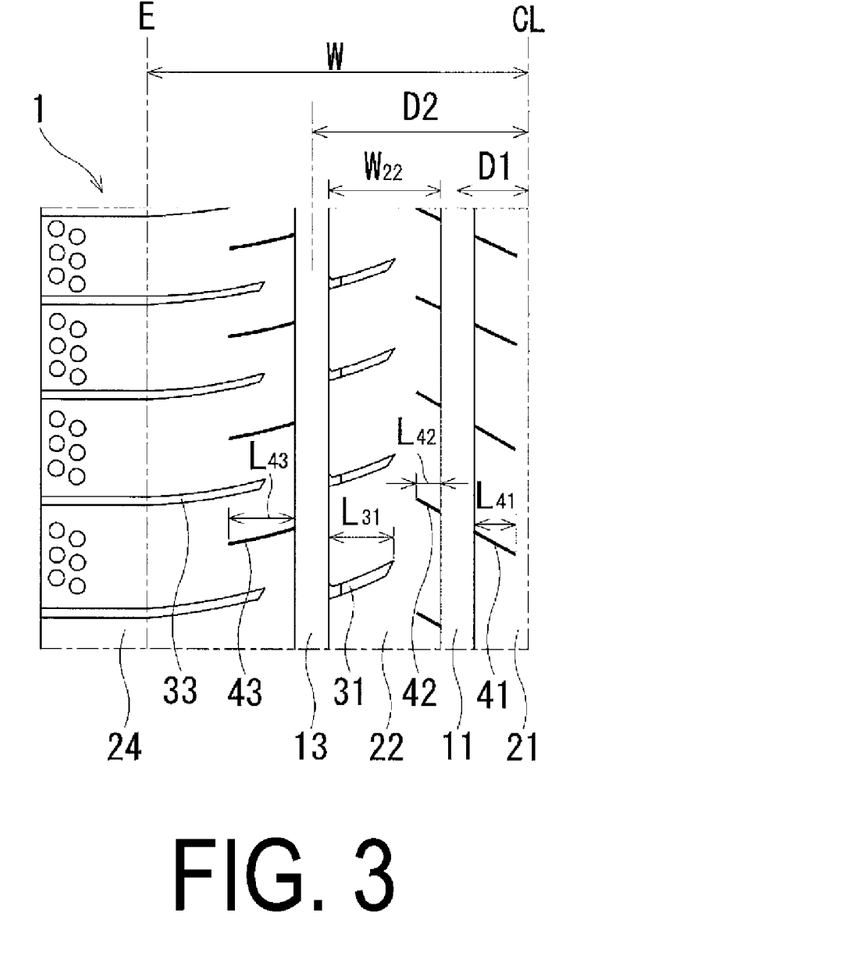
FIG. 3 is a plan view illustrating a main portion of the tread pattern in FIG. 2.

Configurations of embodiments of the present technology will be described in detail below with reference to the accompanying drawings. FIGS. 1 to 3 illustrate a pneumatic tire according to an embodiment of the present technology. This pneumatic tire is a tire that has a designated mounting direction for the tire front/back when mounted on a vehicle. In FIGS. 1 and 2, IN is a vehicle inner side when the tire is mounted on a vehicle, and OUT is a vehicle outer side when the tire is mounted on a vehicle.

As illustrated in FIG. 1, a pneumatic tire according to the present embodiment includes a tread portion 1 having an annular shape and extending in a tire circumferential direction, a pair of sidewall portions 2, 2 disposed on both sides of the tread portion 1, and a pair of bead portions 3, 3 disposed on an inner side of the sidewall portions 2 in a tire radial direction.

A carcass layer 4 is mounted between the pair of bead portions 3, 3. The carcass layer 4 includes a plurality of reinforcing cords extending in the tire radial direction and is folded back around bead core 5 disposed in each of the bead portions 3 from a tire inner side to a tire outer side. A bead filler 6 having a triangular cross-sectional shape and formed of a rubber composition is disposed on the outer circumference of the bead core 5.

A plurality of belt layers 7 are embedded on the outer circumferential side of the carcass layer 4 in the tread portion 1. Each of the belt layers 7 includes a plurality of reinforcing cords that are inclined with respect to the tire circumferential direction, and the reinforcing cords are disposed so as to intersect each other between the layers. In the belt layers 7, the inclination angle of the reinforcing cords with respect to the tire circumferential direction is set to fall within a range of 10° to 40°, for example. Steel cords are preferably used as the reinforcing cords of the belt layers 7. To improve high-speed durability, at least one belt cover layer 8, formed by disposing reinforcing cords at an angle of, for example, not greater than 5° with respect to the tire circumferential direction, is disposed on an outer circumferential side of the belt layers 7. Organic fiber cords such as nylon and aramid are preferably used as the reinforcing cords of the belt cover layer 8.

Note that the tire internal structure described above represents a typical example for a pneumatic tire, and the pneumatic tire is not limited thereto.

As illustrated in FIG. 2, the tread portion 1 is formed with four main grooves 11 to 14 extending in the tire circumferential direction. More specifically, the tread portion 1 is formed with a center main groove 11 located on a vehicle inner side of a tire center line CL, a center main groove 12 located on a vehicle outer side of the tire center line CL, a shoulder main groove 13 located further on the vehicle inner side than the center main groove 11, and a shoulder main groove 14 located further on the vehicle outer side than the center main groove 12. Here, the center main groove 12 on the vehicle outer side includes a chamfered portion 12A having a zigzag shape along the tire circumferential direction, but the other main grooves 11, 13, and 14 are linear. With these four main grooves 11 to 14, the tread portion 1 is defined by a center land portion 21 located on the tire center line CL, an inner intermediate land portion 22 located further on the vehicle inner side than the center land portion 21, an outer intermediate land portion 23 located further on the vehicle outer side than the center land portion 21, an inner shoulder land portion 24 located further on the vehicle inner side than the inner intermediate land portion 22, and an outer shoulder land portion 25 located further on the vehicle outer side than the outer intermediate land portion 23.

In the center land portion 21, a plurality of sipes 41 extending in the tire width direction are formed at intervals in the tire circumferential direction. Each of the plurality of sipes 41 includes one end that communicates with the center main groove 11 on the vehicle inner side, and an other end that terminates in the center land portion 21 without exceeding the tire center line CL.

In the inner intermediate land portion 22, a plurality of lug grooves 31 extending in the tire width direction are formed at intervals in the tire circumferential direction. Each of the plurality of lug grooves 31 includes one end that communicates with the shoulder main groove 13 on the vehicle inner side, and an other end that terminates in the inner intermediate land portion 22. Moreover, in the inner intermediate land portion 22, a plurality of sipes 42 extending in the tire width direction are formed at intervals in the tire circumferential direction. Each of the plurality of sipes 42 includes one end that communicates with the center main groove 11 on the vehicle inner side, and an other end that terminates in the inner intermediate land portion 22.

In the outer intermediate land portion 23, a plurality of lug grooves 32 extending in the tire width direction are formed at intervals in the tire circumferential direction. Each of the plurality of lug grooves 32 includes one end that communicates with the shoulder main groove 14 on the vehicle outer side, and an other end that terminates in the outer intermediate land portion 23.

Moreover, in the inner shoulder land portion 24, a plurality of lug grooves 33 extending toward the inner side in the tire width direction from an end portion of the tread portion 1 are formed at intervals in the tire circumferential direction. Each of the plurality of lug grooves 33 includes one end that reaches at least a ground contact edge E, and an other end that terminates in the inner shoulder land portion 24. Furthermore, in the inner shoulder land portion 24, a plurality of sipes 43 extending in the tire width direction are formed at intervals in the tire circumferential direction. Each of the plurality of sipes 43 includes one end that communicates with the shoulder main groove 13 on the vehicle inner side, and an other end that terminates in the inner shoulder land portion 24.

In the outer shoulder land portion 25, a plurality of lug grooves 34 extending in the tire width direction are formed at intervals in the tire circumferential direction. Each of the lug grooves 34 includes one end that reaches at least the ground contact edge E, and an other end that terminates in the outer shoulder land portion 25. In the outer shoulder land portion 25, a plurality of sipes 44 extending in the tire width direction are formed at intervals in the tire circumferential direction. Each of the plurality of sipes 44 includes one end that communicates with the shoulder main groove 14 on the vehicle outer side, and an other end that terminates in the outer shoulder land portion 25.

Note that FIG. 2 illustrates an embodiment in which one end of each of the plurality of lug grooves 33 of the inner shoulder land portion 24 and of the plurality of lug grooves 34 of the outer shoulder land portion 25 reaches an end portion of the tread portion 1 over the contact edge E, but the embodiment is not limited to this, as long as the one end reaches at least the ground contact edge E.

According to the above pneumatic tire, in a pneumatic tire that has a designated mounting direction with respect to a vehicle, by adopting a structure in which the inner intermediate land portion 22, the outer intermediate land portion 23, the inner shoulder land portion 24, and the outer shoulder land portion 25 are not divided by the lug grooves 31 to 34, the rigidity of each land portion 22 to 25 may be sufficiently ensured, and thus the steering stability performance on dry road surfaces may be improved. In particular, by providing the lug grooves 31 and the sipes 42 in the inner intermediate land portion 22, rigidity of the inner intermediate land portion 22 can be ensured, and responsiveness on dry road surfaces can be maintained. Furthermore, the absence of grooves that communicate with the center main groove 12 on the vehicle outer side makes it possible to increase the pattern rigidity and to improve the steering stability performance on dry road surfaces. On the other hand, more lug grooves and sipes are disposed on the vehicle inner side, which has a high improvement effect on snow performance when a chain is mounted to the pneumatic tire (in particular, steering stability performance on snow-covered road surfaces), than on the vehicle outer side, and thus the edge component is relatively large. In particular, in the inner shoulder land portion 24 and the outer shoulder land portion 25, the edge components can be compensated for by the sipes 43, 44 without reducing the rigidity of the inner shoulder land portion 24 and the outer shoulder land portion 25 while ensuring sufficient edge components by the lug grooves 33, 34. As a result, both steering stability performance on dry road surfaces and snow performance when a chain is mounted (in particular, steering stability performance on snow-covered road surfaces) can be provided in a compatible manner.

In FIG. 2, each sipe 41 in the center land portion 21 is disposed on an extension line of each sipe 42, in the inner intermediate land portion 22, that faces each sipe 41 across the center main groove 11 on the vehicle inner side. An inclination angle $\theta$ on the acute angle side with respect to the tire circumferential direction of both of the sipes 41, 42 is preferably set to be in a range of from 55° to 75°. By configuring the sipes 41 and the sipes 42 in this manner, snow performance when a chain is mounted can be effectively improved.

Further, the lug grooves 31 in the inner intermediate land portion 22 and the lug grooves 32 in the outer intermediate land portion 23 are respectively provided with raised bottom portions 31A and 32A at opening ends with respect to the shoulder main grooves 13, 14. By providing the raised bottom portions 31A, 32A in the lug grooves 31, 32 respectively in this way, the rigidity of the inner intermediate land portion 22 and the outer intermediate land portion 23 can be sufficiently ensured. Note that in the embodiment of FIG. 2, an example is illustrated in which the raised bottom portion 31A, 32A is provided in each of the lug grooves 31 and the lug grooves 32 respectively, but the present technology is not limited thereto, and the raised bottom portion may be provided in only one of the lug grooves 31 and the lug grooves 32.

Furthermore, the center main groove 12 on the vehicle outer side includes the zigzag-shaped chamfered portion 12A. By providing the chamfered portion 12A having a zigzag shape with respect to the center main groove 12 in this way, snow performance when a chain is mounted can be effectively improved based on the edge effect of the chamfered portion 12A.

In the pneumatic tire described above, the lengths in the tire width direction of the lug grooves 31 to 34 and the sipes 41 to 44 in the land portions 21 to 25 are preferably set as follows. In the ground contact region, the sum of the lengths in the tire width direction of the lug grooves 31, 33 and the sipes 41 to 43 located on the vehicle inner side of the tire center line CL is referred to as a total length $T_{IN}$, and the sum of the lengths in the tire width direction of the lug grooves 32, 34 and the sipes 44 located on the vehicle outer side of the tire center line CL is referred to as a total length $T_{OUT}$. Additionally, in the entire tread portion 1, a total length in the tire width direction of the lug grooves 31 to 34 is defined as a total length T1, and a total length in the tire width direction of the sipes 41 to 44 is defined as a total length T2. At this time, preferably, the total length $T_{OUT}$ is shorter than the total length $T_{IN}$ and the ratio T2/T1 of the total length T2 to the total length T1 is from 0.4 to 0.6. By setting the lengths of the lug grooves 31 to 34 and the sipes 41 to 44 in the tire width direction so as to satisfy such a relationship, the rigidity of each of the land portions 21 to 25 in the tread portion 1 can be maintained.

Further, in the lug grooves 31 and the sipes 41 to 43 formed in the land portions 21, 22 and 24 located on the vehicle inner side, the length of each groove in the tire width direction is defined as a length L (see FIG. 3). At this time, preferably, a length $L_{43}$ of each sipe 43 in the inner shoulder land portion 24 is equivalent to a length $L_{31}$ of each lug groove 31 in the inner intermediate land portion 22, and equivalent to a sum T3 of a length $L_{41}$ of each sipe 41 in the center land portion 21 and a length $L_{42}$ of each sipe 42 in the inner intermediate land portion 22. In other words, preferably, the difference between the length $L_{43}$ and the length $L_{31}$ is ±2 mm, and the difference between the length $L_{43}$ and the sum T3 (the total length of the length $L_{41}$ and the length $L_{42}$) is ±2 mm. In particular, the length $L_{31}$ of the lug groove 31 in the inner intermediate land portion 22 is more preferably in the range of from 0.5 to 0.7 with respect to a width $W_{22}$ of the inner intermediate land portion 22. In the lug grooves 31 and the sipes 41 to 43 of the land portions 21, 22, 24 located on the vehicle inner side, by setting a length L in the tire width direction to an appropriate degree as described above, the rigidity of the center land portion 21 can be sufficiently ensured, and steering stability performance on dry road surfaces can be effectively improved.

Additionally, the width from the tire center line CL to the ground contact edge E is defined as a width W, the distance from the tire center line CL to the center of the groove of the center main groove 11 is defined as a distance D1, and the distance from the tire center line CL to the center of the groove of the shoulder main groove 13 is defined as a distance D2 (see FIG. 3). At this time, preferably, the center main groove 11 is disposed in a region of from 15% to 25% with respect to the width W, and the shoulder main groove 13 is disposed in a region of from 55% to 65% with respect to the width W. In other words, preferably, the ratio of the distance D1 to the width W is in the range of from 15% to 25%, and the ratio of the distance D2 to the width W is in the range of from 55% to 65%. In particular, more preferably, the ratio of the distance D1 to the width W is 18%, and the ratio of the distance D2 to the width W is 60%. By setting the ratios of the distance D1 and the distance D2 to the width W appropriately in this manner, the inner shoulder land portion 24 is configured so as to be relatively large, and it is possible to effectively improve steering stability performance on dry road surfaces. In the embodiment of FIG. 3, the distances D1 and D2 are illustrated as the distances to the center main groove 11 and the shoulder main groove 13 on the vehicle inner side, but the same preferably applies to the center main groove 12 and the shoulder main groove 14 on the vehicle outer side. By configuring the inner shoulder land portion 24 and the outer shoulder land portion 25 relatively larger in the entire tread portion 1 (on both the vehicle inner side and the vehicle outer side), a further improvement effect in steering stability performance on dry road surfaces can be obtained.

EXAMPLE

Tires of Examples 1 to 7 described as following were manufactured. Each of the tires of Examples 1 to 7 has a tire size of 225/45R18 with a specified mounting direction with respect to a vehicle and includes: a tread portion; a pair of sidewall portions; and a pair of bead portions, where the tread portion includes four main grooves, extending in the tire circumferential direction, including: a pair of center main grooves; and a pair of shoulder main grooves, the four main grooves define: a center land portion; a pair of intermediate land portions located on outer sides of the center land portion; and a pair of shoulder land portions located on outer sides of the intermediate land portions. As illustrated in FIG. 2, lug grooves and sipes extending in the tire width direction are provided in each of the shoulder land portions on the vehicle inner side and on the vehicle outer side, and each of the lug grooves in each of the shoulder land portions includes: one end that reaches at least a ground contact edge and an other end that terminates in each of the shoulder land portions, and each of the sipes in each of the shoulder land portions includes: one end that communicates with the shoulder main groove and an other end that terminates in a ground contact region, lug grooves extending in the tire width direction are provided in each of the intermediate land portions on the vehicle inner side and on the vehicle outer side, and each of the lug grooves in each of the intermediate land portions includes: one end that communicates with the shoulder main groove and an other end that terminates in the intermediate land portion, sipes extending in the tire width direction are provided in the intermediate land portion on the vehicle inner side, and each of the sipes in the intermediate land portion on the vehicle inner side includes: one end that communicates with the center main groove on the vehicle inner side and an other end that terminates in the intermediate land portion on the vehicle inner side, sipes extending in the tire width direction are provided in the center land portion, and each of the sipes in the center land portion includes: one end that communicates with the center main groove on the vehicle inner side and an other end that terminates in the center land portion without exceeding the tire center line.

For comparison, a Conventional Example tire having the same structure as that of Example 1 except for the following configuration was prepared: two types of lug grooves extending in the tire width direction are provided in each of the shoulder land portions on the vehicle inner side and on the vehicle outer side, and each of the first type of lug grooves includes one end that reaches at least the ground contact edge and an other end that communicates with the shoulder main groove, each of the second type of lug grooves includes one end that communicates with the shoulder main groove and an other end that terminates in the ground contact region; lug grooves and sipes extending in the tire width direction are provided in the center land portion, each of the lug grooves in the center land portion includes one end that communicates with the center main groove on the vehicle inner side, and an other end that terminates in the center land portion without exceeding the tire center line, each of the sipes in the center land portion includes one end that communicates with the center main groove on the vehicle outer side and an other end that terminates in the center land portion without exceeding the tire center line. In other words, the tire of the Conventional Example has a structure in which the lug grooves of the shoulder land portions in Example 1 communicate with the shoulder main grooves, the sipes in each of the center land portion and the shoulder land portions in Example 1 are replaced with lug grooves, and sipes are added to the center land portion.

In Examples 1 to 7, the following items are set as shown in Table 1: a positional relationship between opposing grooves across the center main groove on the vehicle inner side; a relationship between the total length $T_{IN}$ of the lug grooves and the sipes on the vehicle inner side and the total length $T_{OUT}$ of the lug grooves and the sipes on the vehicle outer side; a ratio (T2/T1) of the total length T2 of the sipes to the total length T1 of the lug grooves in the entire tread portion; a relationship between the length of each sipe in the inner shoulder land portion and a length of each lug groove in the inner intermediate land portion; a relationship between a length of each sipe in the shoulder land portion on the vehicle inner side and the sum of a length of each sipe in the intermediate land portion on the vehicle inner side and a length of each sipe in the center land portion; a ratio (D1/W×100%) of the distance D1 to the width W; a ratio (D2/W×100%) of the distance D2 to the width W; presence of the raised bottom portion in each lug groove in the intermediate land portions; and presence of the chamfered portion in the center main groove on the vehicle outer side. In Table 1, the length of the lug groove or the sipe, or the total length of the lug grooves or the sipes is based on the length measured along the tire width direction.

These test tires were evaluated for steering stability performance on dry road surfaces and snow performance when a chain is mounted (steering stability performance on snow-covered road surfaces) by the following test methods, and the results are also given in Table 1.

Steering Stability Performance on Dry Road Surfaces:

Each test tire was mounted on a wheel with a rim size of 18×7.5 J, and then mounted on a vehicle with a displacement of 2000 cc, and a sensory evaluation was conducted by a panelist when driving on dry road surfaces. The evaluation results were expressed as 10 grade evaluation values. A larger evaluation value indicates superior steering stability performance on dry road surfaces.

Snow Performance when a Chain is Mounted (Steering Stability Performance on Snow-Covered Road Surfaces):

Each test tire was mounted on a wheel with a rim size of 18×7.5 J, then a chain was mounted on a drive wheel of a vehicle with a displacement of 2000 cc, and sensory evaluation was conducted by a panelist when driving on snow-covered road surfaces. The evaluation results were expressed as 10 grade evaluation values. A larger evaluation value indicates superior steering stability performance on snow-covered road surfaces.

TABLE 1

|  | Conventional Example | Example 1 | Example 2 | Example 3 |
|---|---|---|---|---|
| Presence of lug grooves communicating with shoulder main grooves in shoulder land portions | Yes | No | No | No |
| Shape of groove extending from shoulder main groove in shoulder land portion | Lug groove | Sipe | Sipe | Sipe |
| Shape of groove in region from tire center line to center main groove on vehicle inner side | Lug groove | Sipe | Sipe | Sipe |
| Presence of sipes in region from tire center line to center main groove on vehicle outer side | Yes | No | No | No |
| Positional relationship between opposing grooves across center main groove on vehicle inner side | Not on extension line | Not on extension line | On extension line | On extension line |
| Relationship between total length $T_{IN}$ of lug grooves and sipes on vehicle inner side and total length $T_{OUT}$ of lug grooves and sipes on vehicle outer side | $T_{IN} = T_{OUT}$ | $T_{IN} = T_{OUT}$ | $T_{IN} = T_{OUT}$ | $T_{IN} > T_{OUT}$ |
| Ratio of total length T2 of sipes to total length T1 of lug grooves in entire tread portion (T2/T1) | 0.3 | 0.3 | 0.3 | 0.5 |
| Relationship between length of each sipe in shoulder land portion on vehicle inner side and length of each lug groove in intermediate land portion on vehicle inner side | Not equivalent | Not equivalent | Not equivalent | Not equivalent |
| Relationship between length of each sipe in shoulder land portion on vehicle inner side and sum of length of each sipe in intermediate land portion on vehicle inner side and length of each sipe in center land portion | Not equivalent | Not equivalent | Not equivalent | Not equivalent |
| Ratio of distance D1 to width W (D1/W × 100%) | 30 | 30 | 30 | 30 |
| Ratio of distance D2 to width W (D2/W × 100%) | 70 | 70 | 70 | 70 |
| Presence of raised bottom portion in each lug groove in intermediate land portions | No | No | No | No |
| Presence of chamfered portion in center main groove on vehicle outer side | No | No | No | No |

TABLE 1-continued

|  | | | | |
| --- | --- | --- | --- | --- |
| Steering stability performance on dry road surfaces | 5.0 | 5.5 | 5.5 | 6.0 |
| Snow performance when chain is mounted (steering stability performance on snow-covered road surfaces) | 5.5 | 5.5 | 6.0 | 6.0 |

|  | Example 4 | Example 5 | Example 6 | Example 7 |
| --- | --- | --- | --- | --- |
| Presence of lug grooves communicating with shoulder main grooves in shoulder land portions | No | No | No | No |
| Shape of groove extending from shoulder main groove in shoulder land portion | Sipe | Sipe | Sipe | Sipe |
| Shape of groove in region from tire center line to center main groove on vehicle inner side | Sipe | Sipe | Sipe | Sipe |
| Presence of sipes in region from tire center line to center main groove on vehicle outer side | No | No | No | No |
| Positional relationship between opposing grooves across center main groove on vehicle inner side | On extension line | On extension line | On extension line | On extension line |
| Relationship between total length $T_{IN}$ of lug grooves and sipes on vehicle inner side and total length $T_{OUT}$ of lug grooves and sipes on vehicle outer side | $T_{IN} > T_{OUT}$ | $T_{IN} > T_{OUT}$ | $T_{IN} > T_{OUT}$ | $T_{IN} > T_{OUT}$ |
| Ratio of total length T2 of sipes to total length T1 of lug grooves in entire tread portion (T2/T1) | 0.5 | 0.5 | 0.5 | 0.5 |
| Relationship between length of each sipe in shoulder land portion on vehicle inner side and length of each lug groove in intermediate land portion on vehicle inner side | Equivalent | Equivalent | Equivalent | Equivalent |
| Relationship between length of each sipe in shoulder land portion on vehicle inner side and sum of length of each sipe in intermediate land portion on vehicle inner side and length of each sipe in center land portion | Equivalent | Equivalent | Equivalent | Equivalent |
| Ratio of distance D1 to width W (D1/W × 100%) | 30 | 18 | 18 | 18 |
| Ratio of distance D2 to width W (D2/W × 100%) | 70 | 60 | 60 | 60 |
| Presence of raised bottom portion in each lug groove in intermediate land portions | No | No | Yes | Yes |
| Presence of chamfered portion in center main groove on vehicle outer side | No | No | No | Yes |
| Steering stability performance on dry road surfaces | 6.5 | 7.0 | 7.5 | 7.5 |
| Snow performance when chain is mounted (steering stability performance on snow-covered road surfaces) | 6.0 | 6.0 | 6.0 | 6.5 |

As can be seen from Table 1, the tires of Examples 1 to 7 were able to simultaneously provide improved steering stability performance on dry road surfaces and snow performance when a chain is mounted (steering stability performance on snow-covered road surfaces) in comparison with the Conventional Example.

The invention claimed is:
1. A pneumatic tire having a specified mounting direction with respect to a vehicle, the pneumatic tire comprising:
   a tread portion extending in a tire circumferential direction and having an annular shape;
   a pair of sidewall portions disposed on both sides of the tread portion; and
   a pair of bead portions disposed on an inner side of the pair of sidewall portions in a tire radial direction,
   the tread portion comprising four main grooves extending in the tire circumferential direction, the four main grooves comprising:
   a pair of center main grooves; and
   a pair of shoulder main grooves,
   the four main grooves defining a center land portion, a pair of intermediate land portions located on outer sides of the center land portion, and a pair of shoulder land portions located on outer sides of the pair of intermediate land portions,
   lug grooves and sipes extending in a tire width direction being provided in, as the pair of shoulder land portions, a shoulder land portion on a vehicle inner side and a shoulder land portion on a vehicle outer side, each of the lug grooves in each of the shoulder land portions comprising:

one end reaching at least a ground contact edge; and an other end terminating in each of the shoulder land portions, each of the sipes in each of the shoulder land portions comprising:

one end communicating with the shoulder main groove; and an other end terminating in a ground contact region, lug grooves extending in the tire width direction being provided in, as the pair of intermediate land portions, an intermediate land portion on the vehicle inner side and an intermediate land portion on the vehicle outer side, each of the lug grooves in each of the intermediate land portions comprising:

one end communicating with the shoulder main groove; and an other end terminating in each of the intermediate land portions, sipes extending in the tire width direction being provided in the intermediate land portion on the vehicle inner side, each of the sipes in the intermediate land portion on the vehicle inner side comprising:

one end communicating with, of the pair of center main grooves, a center main groove on the vehicle inner side; and an other end terminating in the intermediate land portion on the vehicle inner side, and sipes extending in the tire width direction being provided in the center land portion, each of the sipes in the center land portion comprising:

one end communicating with the center main groove on the vehicle inner side; and an other end terminating in the center land portion without exceeding the tire center line, wherein in the ground contact region, a total length in the tire width direction of the lug grooves and the sipes on the vehicle outer side of the tire center line is shorter than a total length in the tire width direction of the lug grooves and the sipes on the vehicle inner side of the tire center line, and as a whole of the tread portion, a ratio of the total length in the tire width direction of the sipes to the total length in the tire width direction of the lug grooves is from 0.4 to 0.6.

2. The pneumatic tire according to claim 1, wherein each of the sipes in the center land portion is on an extension line of each of the sipes in the intermediate land portion on the vehicle inner side.

3. The pneumatic tire according to claim 1, wherein
a length in the tire width direction of each of the sipes in the shoulder land portion on the vehicle inner side is equivalent to a length in the tire width direction of each of the lug grooves in the intermediate land portion on the vehicle inner side, and is equivalent to the sum of a length in the tire width direction of each of the sipes in the center land portion and a length in the tire width direction of each of the sipes in the intermediate land portion on the vehicle inner side.

4. The pneumatic tire according to claim 1, wherein
the center main groove is disposed in a region of from 15% to 25% with respect to a width from the tire center line to the ground contact edge, and
the shoulder main groove is disposed in a region of from 55% to 65% with respect to the width from the tire center line to the ground contact edge.

5. The pneumatic tire according to claim 1, wherein each of the lug grooves in the pair of intermediate land portions comprises a raised bottom portion at an opening end with respect to the pair of shoulder main grooves.

6. The pneumatic tire according to claim 1, wherein, of the pair of center main grooves, a center main groove on the vehicle outer side comprises a zigzag-shaped chamfered portion.

7. The pneumatic tire according to claim 2, wherein
a length in the tire width direction of each of the sipes in the shoulder land portion on the vehicle inner side is equivalent to a length in the tire width direction of each of the lug grooves in the intermediate land portion on the vehicle inner side, and is equivalent to the sum of a length in the tire width direction of each of the sipes in the center land portion and a length in the tire width direction of each of the sipes in the intermediate land portion on the vehicle inner side.

8. The pneumatic tire according to claim 7, wherein
the center main groove is disposed in a region of from 15% to 25% with respect to a width from the tire center line to the ground contact edge, and
the shoulder main groove is disposed in a region of from 55% to 65% with respect to the width from the tire center line to the ground contact edge.

9. The pneumatic tire according to claim 8, wherein each of the lug grooves in the pair of intermediate land portions comprises a raised bottom portion at an opening end with respect to the pair of shoulder main grooves.

10. The pneumatic tire according to claim 9, wherein, of the pair of center main grooves, a center main groove on the vehicle outer side comprises a zigzag-shaped chamfered portion.

11. A pneumatic tire having a specified mounting direction with respect to a vehicle, the pneumatic tire comprising:
a tread portion extending in a tire circumferential direction and having an annular shape;
a pair of sidewall portions disposed on both sides of the tread portion; and
a pair of bead portions disposed on an inner side of the pair of sidewall portions in a tire radial direction,
the tread portion comprising four main grooves extending in the tire circumferential direction, the four main grooves comprising:
a pair of center main grooves; and
a pair of shoulder main grooves,
the four main grooves defining a center land portion, a pair of intermediate land portions located on outer sides of the center land portion, and a pair of shoulder land portions located on outer sides of the pair of intermediate land portions,
lug grooves and sipes extending in a tire width direction being provided in, as the pair of shoulder land portions, a shoulder land portion on a vehicle inner side and a shoulder land portion on a vehicle outer side,
each of the lug grooves in each of the shoulder land portions comprising:
one end reaching at least a ground contact edge; and
an other end terminating in each of the shoulder land portions, each of the sipes in each of the shoulder land portions comprising:
one end communicating with the shoulder main groove; and
an other end terminating in a ground contact region,
lug grooves extending in the tire width direction being provided in, as the pair of intermediate land portions, an intermediate land portion on the vehicle inner side and an intermediate land portion on the vehicle outer side,
each of the lug grooves in each of the intermediate land portions comprising:
one end communicating with the shoulder main groove; and
an other end terminating in each of the intermediate land portions,
sipes extending in the tire width direction being provided in the intermediate land portion on the vehicle inner side,
each of the sipes in the intermediate land portion on the vehicle inner side comprising:
one end communicating with, of the pair of center main grooves, a center main groove on the vehicle inner side; and
an other end terminating in the intermediate land portion on the vehicle inner side, and
sipes extending in the tire width direction being provided in the center land portion,
each of the sipes in the center land portion comprising:
one end communicating with the center main groove on the vehicle inner side; and
an other end terminating in the center land portion without exceeding the tire center line, wherein
a length in the tire width direction of each of the sipes in the shoulder land portion on the vehicle inner side is equivalent to a length in the tire width direction of each of the lug grooves in the intermediate land portion on the vehicle inner side, and is equivalent to the sum of a length in the tire width direction of each of the sipes in the center land portion and a length in the tire width direction of each of the sipes in the intermediate land portion on the vehicle inner side.

\* \* \* \* \*